United States Patent [19]

Czajkowski et al.

[11] Patent Number: 4,653,620
[45] Date of Patent: Mar. 31, 1987

[54] FAILSAFE FAN CLUTCH

[75] Inventors: Julian Czajkowski, Rodney; Allan DeJong, Chatham, both of Canada

[73] Assignee: Canadian Fram Limited, Chatham, Canada

[21] Appl. No.: 739,404

[22] Filed: May 30, 1985

[51] Int. Cl.$^4$ .................. F16D 13/02; F16D 13/14; F16D 67/02
[52] U.S. Cl. .................. 192/17 R; 192/18 R; 192/26; 192/75; 192/105 CD
[58] Field of Search .............. 192/17 C, 17 R, 18 A, 192/18 B, 18 R, 26, 27, 75, 82 T, 103 B, 105 CD

[56] References Cited

U.S. PATENT DOCUMENTS 1,940,407  12/1933  Fawick ........................... 192/75
3,055,474  9/1962  Ferris et al. .................. 192/82 T Primary Examiner—Rodney H. Bonck
Attorney, Agent, or Firm—Markell Seitzman; Russel C. Wells

[57] ABSTRACT

A fan clutch having an engaged and disengaged mode of operation comprising: a plurality of centrifugal force responsive friction shoes for drivingly engaging an engagement surface; of the engagement and disengagement of the friction shoes controlled by plurality to disks, one of the disks rotatable relative to the other disk.

32 Claims, 7 Drawing Figures

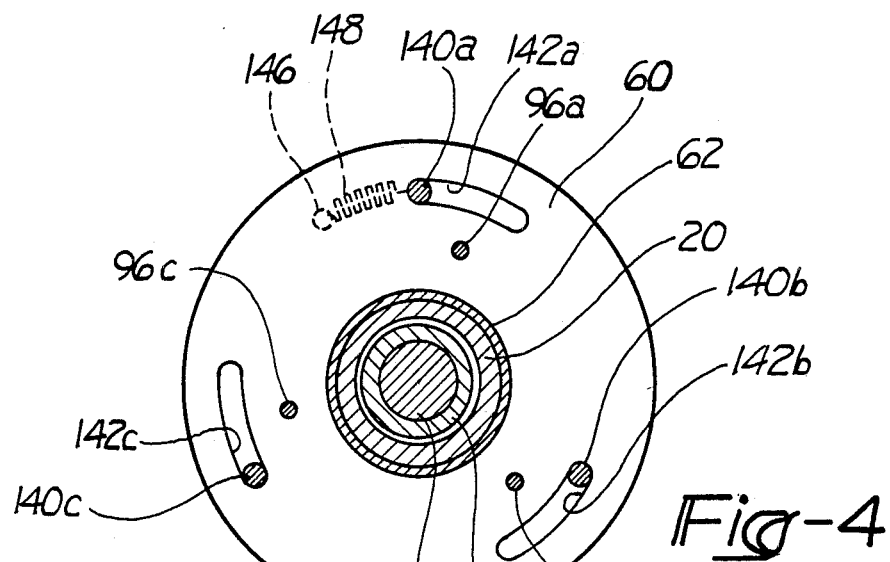
Fig-4
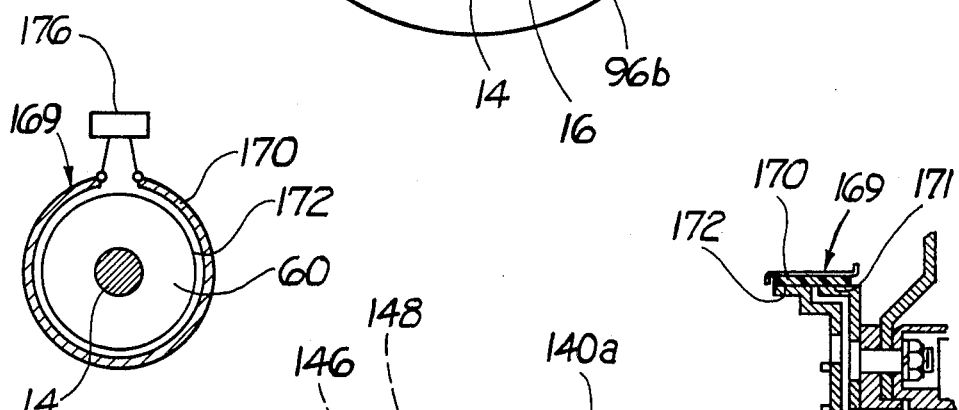
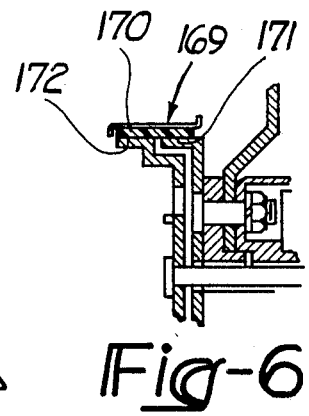
Fig-7
Fig-6
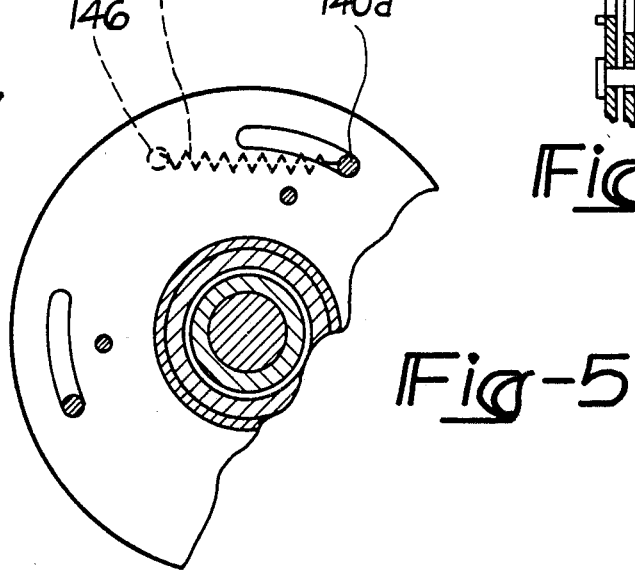
Fig-5

FAILSAFE FAN CLUTCH

BACKGROUND AND SUMMARY OF THE INVENTION

The present invention relates to automotive fan clutches and more particularly to centrifugal force responsive clutches.

The present invention finds application for activating an automotive fan by using a plurality of internal, expanding, centrifugal acting friction shoes attached to a driven assembly. A plurality of sliding disks selectively bias a plurality of leaf springs to provide the initial torque for the friction shoes to rotate the driven assembly. The friction shoe torque capacity is designed to be greater than the torque of the driven assembly at any input driving speed causing the driven assembly to increase in speed until it reaches driving speed thus providing for a smooth engagement. The invention preferably requires the driven assembly torque and the torque capacity of the internal shoes to follow a squared function of speed.

It is an objective of the present invention to activate a fan using a centrifugally responsive clutching mechanism. A further object of the present invention is to selectively engage and disengage a preload force on a plurality of friction shoes in cooperation with a plurality of rotating disks of differing inertia. The disks are free to rotate relative to one another by a limited amount. The rotation of the disks being controlled, in part, by a brake mechanism. Accordingly, the invention comprises: a centrifugally responsive clutch having an engaged and disengaged mode of operation comprising a driving or input member; a drum rotated by the driving member including an engagement surface and a driven member rotationally isolated from the driving member and adapted to be driven by the drum; and a brake mechanism isolated from the driving and driven members and adapted to apply a braking force to the driven member. The driven member includes a plurality of centrifugal force responsive friction shoes for drivingly engaging the engagement surface and means of generating a preload force on the friction shoes towards the engagement surface. The clutch including means for engaging and disengaging the friction shoes including a plurality to rotating disks, one of the disks rotatable with the driven member including means for causing the disks to rotate relative to one another, the relative rotation causing the engagement and disengagement of the preload on the friction shoes. Upon application of the brake the driven member slows to a stop. To disengage the driving from the driven member preferably requires the application of a brake which has a brake torque capacity greater than the difference between the torque capacity of the friction shoes minus the driving torque.

BRIEF DESCRIPTION OF THE DRAWINGS

In the drawings:

FIGS. 4 and 5 illustrate other members of the clutch in their engaged and disengaged mode of operations, respectively.

FIG. 6 illustrates a partial cross-sectional view showing an alternate braking mechanism.

FIG. 7 schematically illustrates a means for activating the brake mechanism of FIG. 6.

DETAILED DESCRIPTION OF THE DRAWINGS

Figure 1:
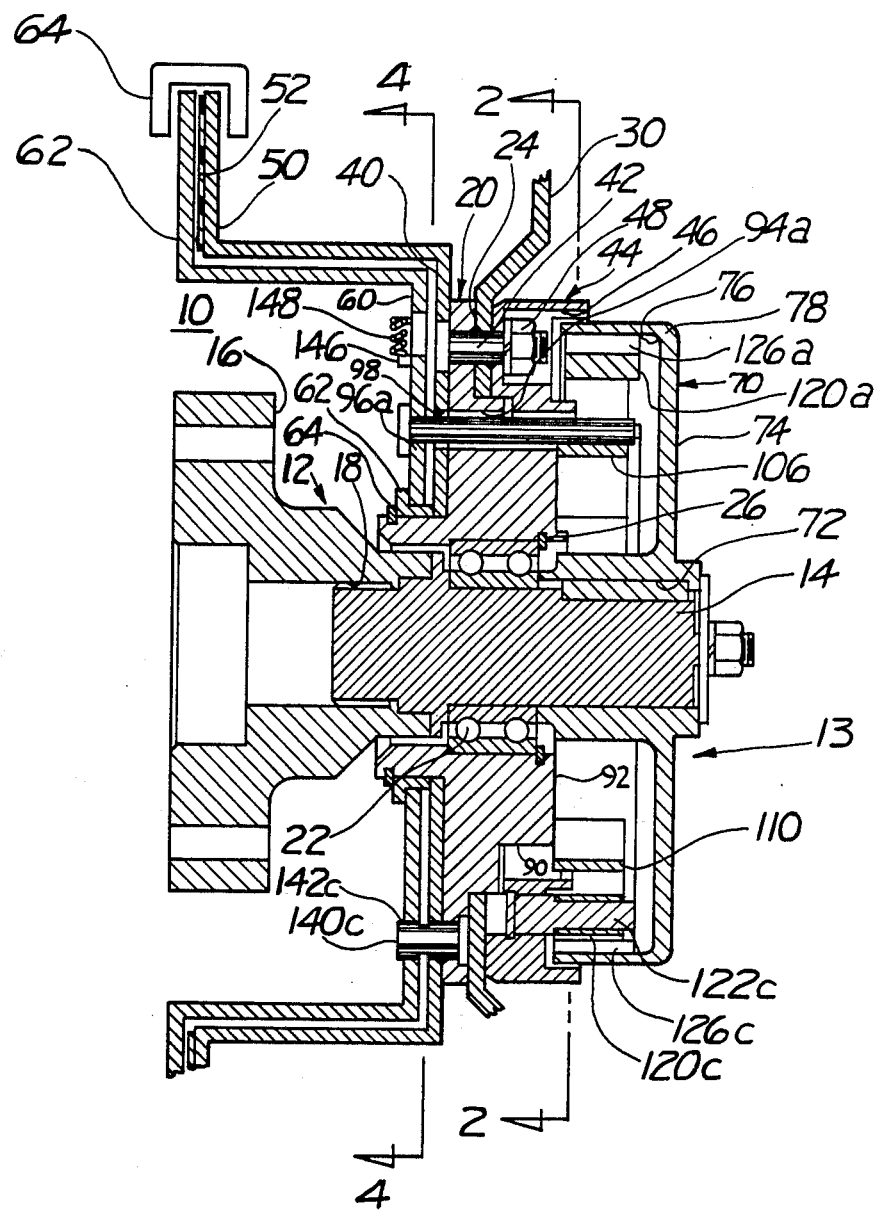
FIG. 1 illustrates a cross-sectional view of a fan clutch.

With reference to the accompanying FIGURES there is illustrated a fan clutch 10. The clutch 10 comprises an input or driving member 12. As illustrated in FIG. 1, the driving member 12 comprises an input shaft 14 that is connected to a flange 16. FIG. 1 illustrates the clutch 10 in an engaged mode of operation with a driven member 13 in engagement with the driving member 12. The flange 16 is adapted, in a known manner, to be mounted on a rotating element of an automotive engine. The shaft 14 and flange 16 may be connected through a left handed thread generally designated as 18. The means for connecting the shaft to the flange is immaterial to the present invention. The driven member 13 includes a fan housing 20 that is isolated from the shaft 14 by the double row ball bearing 22. The bearing 22 is positioned within the fan housing 20 by means of a snap ring 26. The fan housing 20 comprises a substantially annular member having an annular mounting surface 24. A fan 30 is secured to and is rotatable with the fan housing 20. The fan 30 and fan housing 20 are secured to a first disk 40 by a plurality of bolts 42. The bolts 42 further secure a fan adaptor plate or hub 44 to the fan housing 20. The hub 44, discussed in greater detail below, comprises an opening 46 or plurality of such openings adapted to receive the nuts 48 which are threadably received upon a corresponding one of the bolts 42. A second disk 60 is rotatably mounted relative to the fan housing 20 and to the first disk 40 by a bushing 62. The bushing 62 may be secured in place by a snap ring 64.

The clutch 10 and more particularly the driven member 13 further includes a drum 70 secured to the shaft 14 through a key 72. The drum 70 comprises a radially extending portion 74 and an axially extending porton 76. The axially extending portion 76 defines a circumferential friction surface 78.

The first disk 40 comprises a radially extending portion 50 preferrably having secured thereon a low friction material such as Teflon generally designated as 52 which is positioned adjacent to a similar radially extending portion 62 of the second disk. A stationary braking device generally designated as 64, such as brake caliper, is positioned in surrounding relation relative to the radially extending portions 50 and 62 of the first and second disks 40 and 60, respectively. A band brake may be substituted for the brake caliper as described below. Upon activation and deactivation of the braking device 64 the clutch 10 will become disengaged and engaged, respectively.

It should be appreciated that the effective moment of inertia of the first disk 40 is larger than the moment of inertia of the second disk 60 by virtue of the fact that the first disk 40 is connected to and rotatable with the more massive components of the clutch 10.

Figure 2:
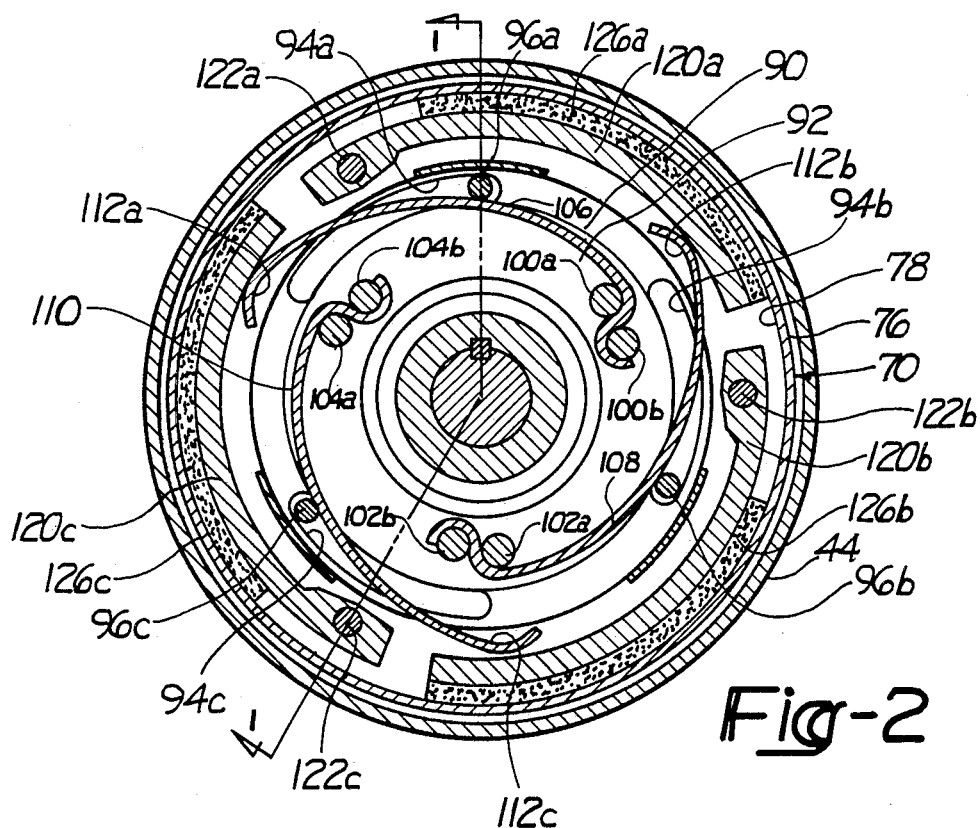
FIGS. 2 and 3 illustrate various components of the clutch in its engaged and disengaged mode of operation, respectively.
Figure 3:
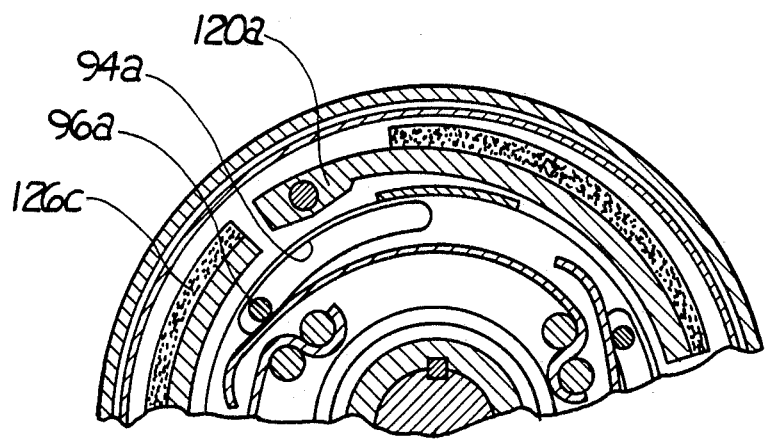

With reference to FIG. 1 it can be seen that the fan housing 20 further includes an axially extending portion 90 which terminates at a flat edge 92. The flat edge 92 is more clearly illustrated in FIGS. 2 and 3. FIG. 2 illustrates the clutch in its engaged mode of operation while FIG. 3 illustrates the clutch in its disengaged mode of operation. More particularly, the fan housing 20 comprises a plurality of arcuately shaped slots 94a-c. Extending through the slots 94 are a like plurality of pins 96a-c. The pins 96 are secured to and rotate with the second disk 60 as shown in FIG. 1 which only illustrates one of the pins 96. The pins 96 further pass through slots 98 in the first disk 40.

The flat edge 92 further supports three pairs of closely spaced pins 100a-b, 102a-b and 104a-b extending therefrom and rigidly embedded in the extending portion 90. Interlaced in between each pair of pins 100, 102, 104 is a leaf spring 106, 108, 110 extending radially therefrom. Each of the leaf springs terminates at an arcuately shaped end generally designated as 112. As described in detail below, the leaf springs 106-110 bias a plurality of internal expanding centrifugal acting friction shoes 120a-c against the friction surface 78 of the drum 70.

Returning briefly to FIG. 1, there is illustrated in the lower portion of this figure a pin 122c. The pin extends from the hub 44 and into the interior of the drum 70. While not shown in FIG. 1, the hub 44 supports three such pins 122a, b, c which are more clearly illustrated in FIGS. 2 and 3. These pins rotationally support the plurality of friction shoes 120a-c. Each of the friction shoes 120 supports an arcuate band of friction material 126a-c for engagement with the friction surface 78 of the drum 70.

The first disk 40 further comprises a plurality of axially extending lugs 140a-c which extend through arcuately shaped openings 142a-c in disk 60. FIG. 1 illustrates the lug 140c while the remaining lugs 140a-b are more clearly illustrated in FIG. 4. FIG. 4 shows the relationship of the two disks 40 and 60 in the engage mode of operation. This condition exists when the brake device is not activated. The lugs 140 extend through the disk 60. The disk 60 further includes a pin 146 or other similar means to secure thereto a spring 148 such as a extension spring which is attached between the pin 146 and the driving lug 140a. It is further noted that the disk 60 can be modified to accommodate two or more of the pins 146 and springs 148. The spring 148 is utilized to rotate the disk 60 relative to the disk 40 to bring the driving lugs into their most counter clockwise position as illustrated in FIG. 4. In addition, during the engaged mode of operation, with the braking device off, the drive connection between the disk 40 and the disk 60 is provided by the spring 148. More particularly, the disk 60 is dragged relative to the disk 40 by virtue of the spring 148 connection.

The engagement and/or disengagement of the leaf springs 106-110 against the friction shoes is controlled by the deactivation and activation, respectively, of the brake device 64. The disengaged mode of operation is obtained by activating the stationary brake device 64. As previously mentioned, the brake device can either be a disk caliper type with brake pads contacting one side of each disk 62 and 50 or an external shoe brake or band brake 169 as shown in FIG. 6. FIG. 6 shows the width of the band brake friction surface 170 contacting friction surfaces 171 and 172 of the first disk 40 and the second disk 60, respectively. One means for moving the band brake 169 into engagement with the disks is by a solenoid activated mechanism 176 schematically illustrated in FIG. 7. As will be seen from the description below, when the brake device is activated the rotation of the lower inertia disk 60 will be stopped and the higher inertia disk 40 and its friction surfaces 50 or 171 will continue to rotate through a limited travel in a clockwise direction with respect to the lower inertia disk 60 and its friction surfaces 62 or 172. This rotation causes the pins 96 to rotate within the slots 94. The pins 96 rotate in a counter-clockwise direction as viewed in the drawings such that these pins 96 force or bias inwardly the corresponding leaf springs 106-110 out of engagement with the friction shoes 120. In addition, during this disengaging mode of operation, with the braking device on, the relative rotation of the two disks will cause the lugs 140 to be placed in the most clockwise portion of the slots 142 as shown in FIG. 5. It should be noted that the length of the slots 142 are preferrably slightly smaller than length of the slots 94 positioned in the fan housing 20. This is due to the fact that it is desirable to prevent the larger inertia disk 40 from contacting the thin pins 96 which extend from the disk 60 during the above described relative rotation of the disks.

In operation the drive 10 has two modes of operation. These two modes are an engaged mode of operation during which the driving force of the input shaft 14 is communicated to the fan 30 and a disengaged mode of operation during which the fan is disengaged from the input shaft 14. The transition between the engaged and disengaged mode of operation is controlled through the activation of the braking device such as the brake caliper 64 or band brake 169. During the engaged mode of operation the braking device is off. Consequently, the disks 60 and 40 are free to rotate relative to each other under the influence of the spring 148. During this engaged mode of operation, the return spring 148 will rotate the lower inertia disk 60 relative to higher inertia disk 40 in a clockwise manner and the higher inertia disk 40 will drag the disk 60 as disk 40 rotates. The clockwise rotation of disk 60 relative to disk 40 further rotates the pins 96 secured to the disk 60 in a clockwise manner relative to fan housing 20 and hub 44, thus achieving an orientation as illustrated in FIG. 2. As the pins 96 are rotated clockwise, as viewed in FIG. 2, the leaf springs 106-110 force the brake shoes 120 against the friction surface 78 of the rotating drum 70. By virtue of the contact between the brake shoes 120 and the rotating drum 70 the fan housing 20, which supports the brake shoes 120, is caused to rotate. Initially, the speed of rotation of the fan 30 will be less than the speed of rotation of the hub 70 because of slippage between the lightly loaded friction shoes 120 against the rotating hub 70. As the speed of the fan 30, i.e., the speed of the friction shoes 120 increases, a centrifugal force is generated which further urges the friction shoes 120 against the hub therein bringing the fan up to the rotational speed of the drum 70 and shaft 14.

When it is desired to disengage the fan 30 from the input shaft 14, control signals are generated to activate the braking device. Upon receipt of these control signals the brake pads of the caliper 64 or friction surface 170 of the band brake 169 engages the extending portions 52, 62 or 171,172 of the disks 40 and 60, respectively. As previously mentioned, the effective moment of inertia of the disk 40 is significantly larger than the moment of inertia of disk 60 by virtue of the fact that disk 40 is connected to a number of the more massive members of the drive 10 including the fan 30. Consequently, upon activation, the brake device 64 will inpart equal magnitude braking forces to the disks 40, 60. The low inertia disk 60 will tend to stop almost immediately and the higher inertia disk 40 will continue to rotate in a clockwise manner as viewed in FIG. 5. Consequently, due to the relative motion of the two disks, the lugs 140 will be rotated clockwise within their respective slots 142 as shown in FIG. 5 and fully extend the return spring 148. This rotation causes the pins 96 to rotate in a counter-clockwise manner relative to their corresponding slots 94 thereby urging the springs 106–110 away from the friction shoes. During this disengaged mode of operation, the combination of the torque capacity of the braking device and the friction shoe torque capacity is insufficient to drive the fan 30 and consequently the fan 30 will stop. When it is desired again to engage the fan, the control signals are removed from the braking device 64 thus permitting the return spring 148 to again rotate the disk 60 and pins 96 in a clockwise manner as viewed in FIGS. 2 and 3 to permit leaf springs 112 to once again force the friction shoes against the rotating drum 70 in the manner as described above.

Many changes and modifications in the above described embodiment of the invention can, of course, be carried out without departing from the scope thereof. Accordingly, that scope is intended to be limited only by the scope of the appended claims.

What is claimed is:

1. A clutch having an engaged and disengaged mode of operation comprising:
   a driving or input member including a first engagement surface thereon;
   a rotatable driven or output member rotationally isolated from and adapted to be driven by said driving member comprising:
   a plurality of centrifugal force responsive friction shoes for drivingly engaging said first engagement surface;
   means for biasing said friction shoes towards said engagement surface;
   a plurality of disks of differing effective moment of inertia;
   first means for permitting said disks to rotate relative one another to a first condition during said engaged mode and for permitting said disks to rotate to a second condition during said disengaged mode; including means for urging said biasing means out of engagement with said friction shoes in said second condition.

2. The clutch as defined in claim 1 wherein said first means includes means for applying a retarding force or torque to at least the lower inertia one of said disks thereby permitting the higher inertia disk to rotate to said second condition relative to said lower inertia disk.

3. The clutch as defined in claim 2 wherein said first means includes means for applying a retarding force or torque to both of said disks.

4. The clutch as defined in claim 2 wherein equal magnitude forces or torques are applied to said disks.

5. The clutch as defined in claim 2 wherein said first means includes resilient coupling means interconnecting said first and said second disks for causing said disks to rotate to said first condition from said second condition absent the application of said retarding force or torque.

6. The clutch as defined in claim 5 wherein said first means includes means for stopping the relative rotation of said disks when said disks have relatively rotated to said second condition.

7. The clutch as defined in claim 5 wherein said coupling means comprises an extension spring.

8. The clutch as defined in claim 7 wherein said stopping means comprises a plurality of arcuate shaped slots in said second disk and a like number of lugs extending from said first disk through at least one slot (142).

9. The clutch as defined in claim 8 wherein said lug contacts one of each of said slots in said second condition.

10. The clutch as defined in claim 8 wherein said coupling means is connected between said second disk and at least one of said lugs.

11. The clutch as defined in claim 5 wherein during said disengaged mode of operation said second disk is rotationally coupled to and is rotated by said first disk.

12. The clutch as defined in claim 11 wherein means for rotationally coupling said disks includes said coupling means.

13. The clutch as defined in claim 11 wherein said urging means includes a plurality of radially positioned slots, and wherein said second disk includes a plurality of pins extending therethrough and engagable with said biasing means, said pins rotatable to said first condition relative to said biasing means to disengage said biasing means from said friction shoes and rotatable to said second condition relative to said biasing means to permit said biasing means to engage said friction shoes.

14. The clutch as defined in claim 13 wherein said driven member comprises a plurality of leaf springs secured at one end thereof, the other end of each of said leaf springs adapted to urge a corresponding one of said friction shoes into engagement with said engagement surface.

15. The clutch as defined in claim 14 wherein each of said friction shoes is pivotally secured to said driven member and includes a second end which supports friction material and wherein said friction material is urged into further contact with said engagement surface as the rotational speed of said driven member inceases.

16. The clutch as defined in claim 15 wherein said applying means includes a band brake for applying equal torsional forces to each of said first and said second disks.

17. The clutch as defined in claim 15 wherein a material having a low coefficient of friction is positioned between said first and said second disks, respectively.

18. The drive as defined in claim 17 wherein the torque capacity of said applying means is greater than the difference between the driven member torque and friction shoe torque.

19. The drive as defined in claim 18 wherein the torque capacity of said brake device is greater than the difference between the driven member torque and friction shoe torque.

20. The clutch as defined in claim 19 wherein said first means comprising means for selectively applying an equal force or torque to each of one first disk and a second disk.

21. The clutch as defined in claim 20 wherein said applying means includes a band brake for applying torsional forces to each of said first and said second disks.

22. The clutch as defined in claim 20 wherein said first means further includes said second disk rotationally movable relative to said driven member and includes at least one radially positioned slot therein, a driving lug extending through each of said at least one slot, said driving lug secured to and rotatable with said first disk and spring means connecting said second disk and said first disk for urging said disks to rotate to a nominal position during instances when said force or torque is not applied.

23. The clutch as defined in claim 22 wherein said spring means comprises a tension spring interconnecting said second disk and said driving lug.

24. The clutch as defined in claim 23 wherein said driven member includes a plurality of radially positioned slots, and wherein said second disk includes a like number of pins extending therethrough and engagable with said biasing means, said disks rotatable to one condition relative to said biasing means for causing said pins to disengage said biasing means from said friction shoes and rotatable to other condition for causing said pins to permit said biasing means to engage said friction shoes.

25. The clutch as defined in claim 24 wherein the moment of inertia of said second disk is less than the moment of inertia of the combination of said driven member and said first disk rotatable therewith.

26. The clutch as defined in claim 25 wherein said spring means comprises a plurality of leaf springs secured to said driven member, the other end of said leaf springs adapted to urge a corresponding one of said friction shoes into engagement with said drum.

27. The clutch as defined in claim 26 wherein each of said friction shoes is pivotally secured to said driven member and includes a second end which supports friction material and wherein said friction material is urged into further contact with said drum as the rotational speed of said driven member increases.

28. The clutch as defined in claim 20 wherein said applying means includes a brake caliper for applying an equal normal force to each of said first and said second disks.

29. The clutch as defined in claim 28 wherein a material having a low coefficient of friction is positioned between said first and said second disks, respectively.

30. The drive as defined in claim 29 wherein the torque capacity of said applying means is greater than the difference between the driven member torque and friction shoe torque.

31. A clutch having an engaged and disengaged mode of operation comprising:
   a driving or input member including a first engagement surface thereon;
   a rotatable driven or output member rotationally isolated from and adapted to be driven by said driving member comprising:
   a plurality of centrifugal force responsive friction shoes for drivingly engaging said first engagement surface;
   means for biasing said friction shoes towards said engagement surface;
   a plurality of disks;
   first means for permitting said disks to rotate relative one another to a first condition during said engaged mode and for permitting said disks to rotate to a second condition during said disengaged mode; including means for urging said biasing means out of engagement with said friction shoes in said second condition.

32. The clutch as defined in claim 31 wherein said disks are of differing effective moment of inertia.

* * * * *